United States Patent [19]

Shikunami et al.

[11] Patent Number: 5,006,703
[45] Date of Patent: Apr. 9, 1991

[54] REFLECTIVE OPTICAL ROTARY ENCODER DISC

[75] Inventors: Juichi Shikunami, Kanagawa; Makoto Itonaga, Yokohama; Kanji Kayanuma, Hatano; Masakatsu Kai, Yokohama; Nobuaki Nakamura, Fujieda, all of Japan

[73] Assignee: Victor Company of Japan, Ltd., Yokohama, Japan

[21] Appl. No.: 427,203

[22] Filed: Oct. 24, 1989

Related U.S. Application Data

[63] Continuation-in-part of Ser. No. 313,672, Feb. 22, 1989, Pat. No. 4,929,822.

[30] Foreign Application Priority Data

Oct. 24, 1988 [JP] Japan ................... 63-267826

[51] Int. Cl.⁵ .............................................. G01D 5/34
[52] U.S. Cl. ............................ 250/231.13; 250/201.5; 341/13
[58] Field of Search .................... 250/231.17, 231.13, 250/201.5; 369/44.26, 275.3; 341/13

[56] References Cited

U.S. PATENT DOCUMENTS 4,600,835  7/1986  Ishida et al. ............. 250/231.17
4,669,077  5/1987  Gerard et al. ............ 369/44.26
4,700,062 10/1987  Ernst ...................... 250/231.17
4,727,528  2/1988  Wyland .................... 369/44.26
4,761,775  8/1988  Murakami .................. 369/44.26

Primary Examiner—David C. Nelms
Assistant Examiner—Khaled Shami
Attorney, Agent, or Firm—Pollock, VandeSande & Priddy

[57] ABSTRACT

A reflective optical rotary encoder device detects an angular speed or position of a rotatable member with a light beam applied to and reflected from a reflective optical encoder disc. The reflective optical rotary encoder disc has an annular encoder track for reflecting the light beam, the encoder track being composed of an annular pattern of angularly spaced pit units each including a plurality of radially spaced arcuate pits, and a pit-free annular focus servo track for focusing the light beam onto the encoder track, the focus servo track extending along and being disposed radially substantially centrally in the annular encoder track. The reflective optical rotary encoder disc further includes at least one arcuate reference pit for reflecting the light beam to produce a reference signal, the reference bit being positioned in the focus servo track and radially aligned with one of the pit units, and an annular tracking servo pit for keeping the light beam applied thereto, the annular tracking servo pit extending along and being disposed radially substantially centrally in the annular focus servo track.

3 Claims, 9 Drawing Sheets

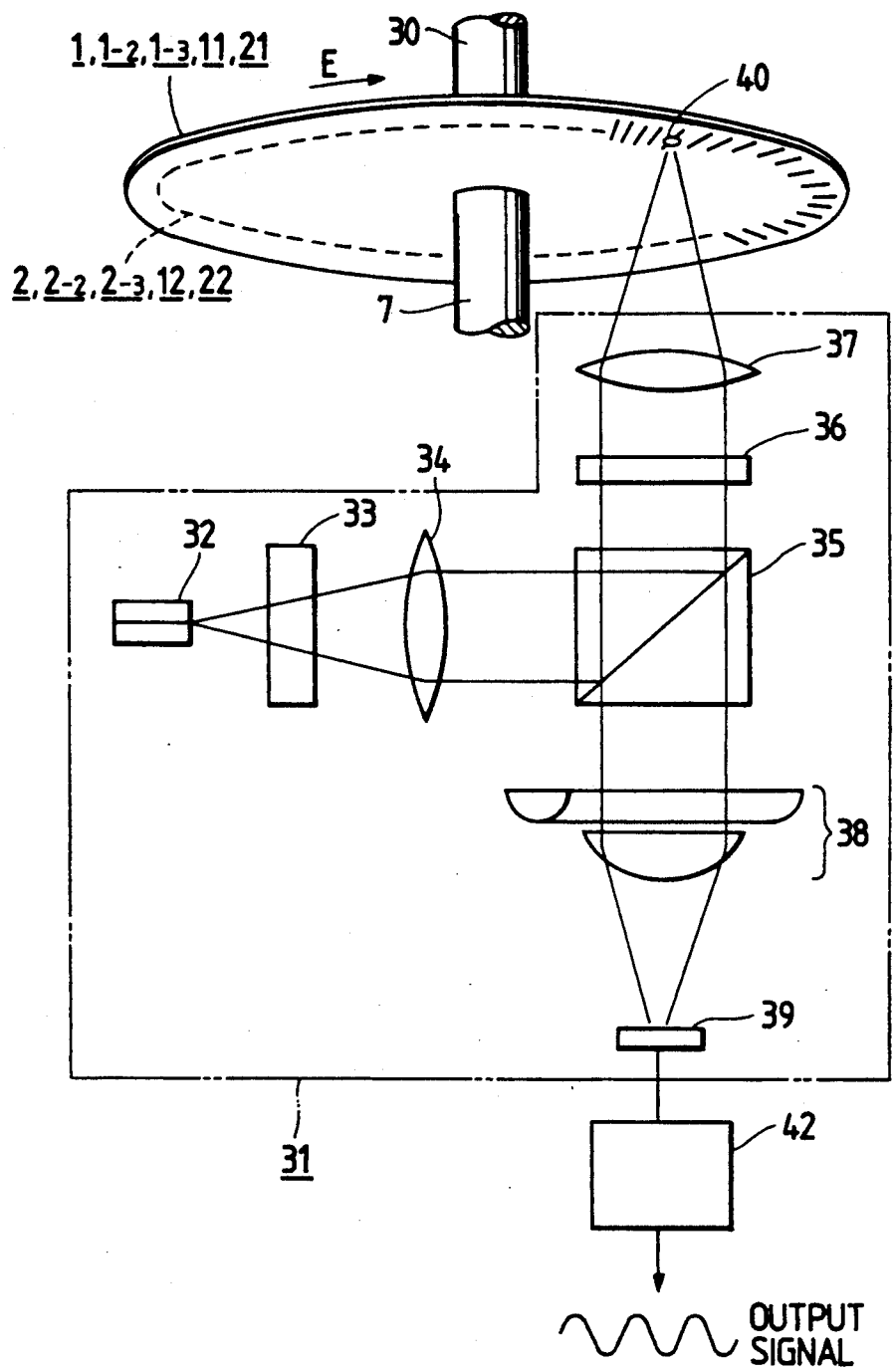

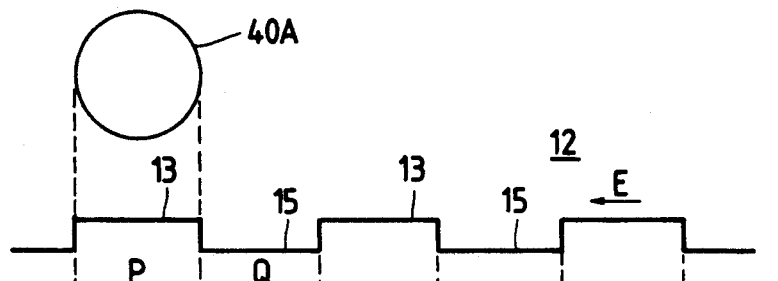
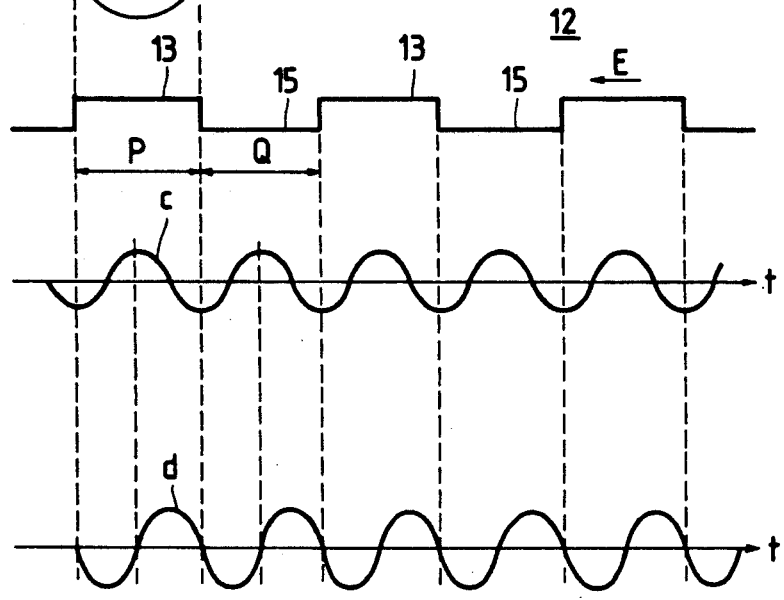
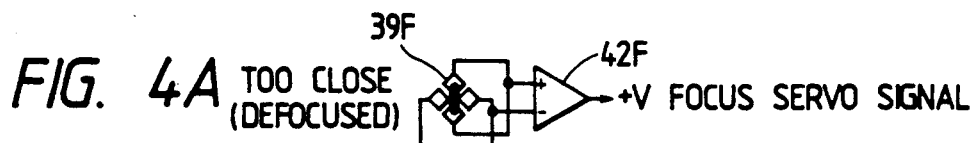
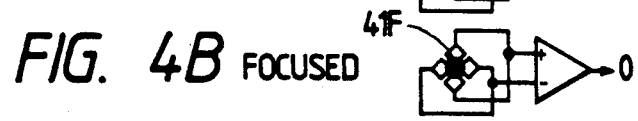

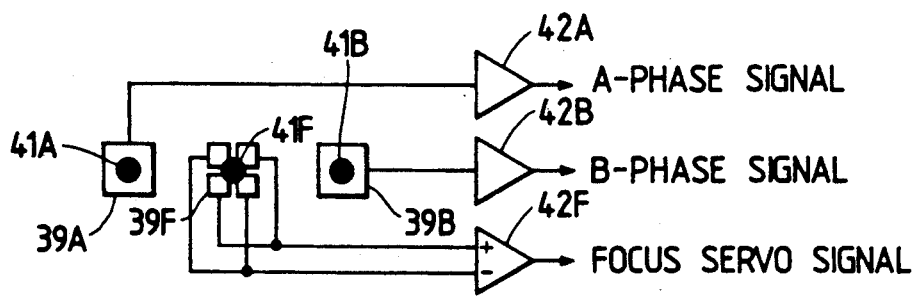
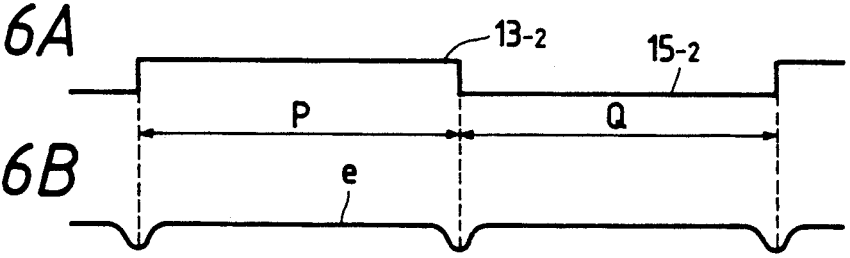
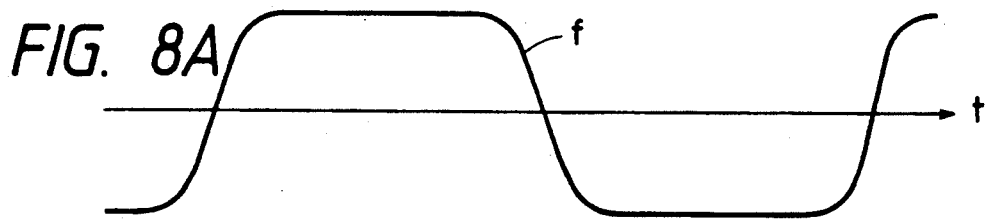
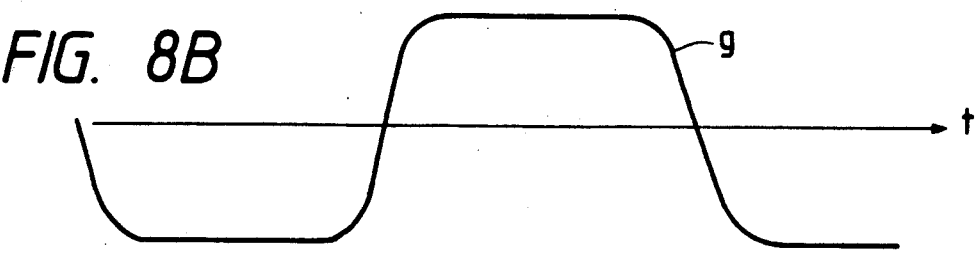

REFLECTIVE OPTICAL ROTARY ENCODER DISC

CROSS-REFERENCE TO RELATED APPLICATIONS

This application is a continuation-in-part of U.S. Ser. No 313,672 filed Feb. 22, 1989.

BACKGROUND OF THE INVENTION

The present invention relates to a reflective optical encoder for use in an optical encoder device for optically detecting an angular or linear speed or position of a movable member with a semiconductor laser beam applied to and reflected therefrom.

Optical encoder devices such as rotary optical encoder devices are widely used in the art. A rotary optical encoder device has an input shaft directly coupled to a rotatable drive shaft. The angular speed or angular position of the drive shaft is optically detected by a light beam applied to and modified somehow by an encoder disc that is coupled to the input shaft.

Optical rotary encoder devices are roughly grouped into two classes. In one class, a rotary encoder disc has a multiplicity of slits or pits which are detected by a light beam passing through the slits or pits and modified thereby during rotation of the rotary encoder disc. According to the other group, slits or pits defined in a rotary encoder disc are detected by a light beam reflected and modified by the slits or pits while the rotary encoder disc is rotating.

More specifically, a reflective rotary optical encoder comprises a rotary encoder disc having ring-shaped encoder tracks in the form of slits or pits defined in a certain circumferential pattern by the process of manufacturing optical discs such as video discs and compact discs. A laser beam which is generated typically by a semiconductor laser is applied to the encoder tracks of the rotary encoder disc. The encoder tracks are thus read by detecting a laser beam reflected from the encoder disc and modulated in intensity by the encoder tracks, and converting the detected laser beam to an electric signal.

SUMMARY OF THE INVENTION

It is an object of the present invention to provide a reflective optical encoder disc for use in a reflective optical encoder device such as a reflective rotary optical encoder device, the encoder disc being designed to allow a focus servo system of the optical encoder to operate stably.

Another object of the present invention is to provide a reflective optical encoder disc which permits a reflective optical encoder device using the same to be designed with greater freedom and to be manufactured with high accuracy.

Still another object of the present invention is to provide a reflective optical encoder disc which permits a reflective optical encoder device using the same to be manufactured at a lower cost.

According to the present invention, there is provided a reflective optical encoder for use in a reflective optical encoder device for detecting an angular or linear speed or position of a movable member with a light beam applied to and reflected from the reflective optical encoder, the reflective optical encoder comprising an encoder track for reflecting the light beam, the encoder track being composed of a pattern of spaced pit units each including a plurality of spaced pits, and a pit-free focus servo track for focusing the light beam onto the encoder track, the focus servo track extending along and being disposed substantially centrally in the encoder track.

The reflective optical encoder also includes at least one reference pit for reflecting the light beam to produce a reference signal, the reference pit being positioned in the focus servo track and aligned with one of the pit units.

The reflective optical encoder further includes a tracking servo pit for keeping the light beam applied thereto, the tracking servo pit extending along and being disposed substantially centrally in the focus servo track.

In preferred embodiments of the present invention, the reflective optical encoder comprises a reflective optical rotary encoder disc, and the encoder track is of an annular shape, with the pit units being angularly spaced at angular intervals and the pits in each unit being radially spaced. The focus servo track is also annular in shape and disposed radially centrally in the encoder track.

Since the focus servo track is free of pits, the focus servo operation of the reflective optical encoder device is stable. The pits of each pit unit of the encoder track are effective in producing an output signal having a symmetric waveform, which allows the reflective optical encoder device to be designed with increased freedom and high accuracy.

A reference signal can be produced by the reference pit without the need for any dedicated device for the generation of such a reference signal. Accordingly, the reflective optical encoder device can be manufactured with a lower cost.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a schematic view of a reflective rotary encoder device which employs a reflective optical encoder disc;

FIGS. 3A through 3D are diagrams showing the relationship between a light beam spot, an encoder track, and output signal waveforms of the rotary encoder device of FIG. 2 which incorporates the encoder disc shown in FIGS. 1A through 1C;

FIGS. 4A through 4C are circuit diagrams illustrating a focus servo system of the rotary encoder device of FIG. 2;

FIG. 5 is a diagram of a signal output section of the rotary encoder device of FIG. 2;

FIGS. 6A and 6B are diagrams illustrative of a pit and an inter-pit land which have large widths;

FIGS. 8A and 8B are diagrams showing output signal waveforms of the rotary encoder device of FIG. 2 which incorporates the encoder disc illustrated in FIGS. 7A and 7B;

DETAILED DESCRIPTION

Figure 1A:
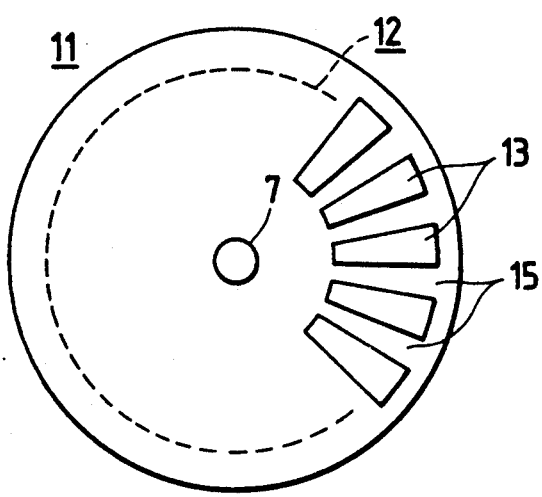
FIG. 1A is a schematic plan view of a reflective optical encoder disc.
Figure 1B:
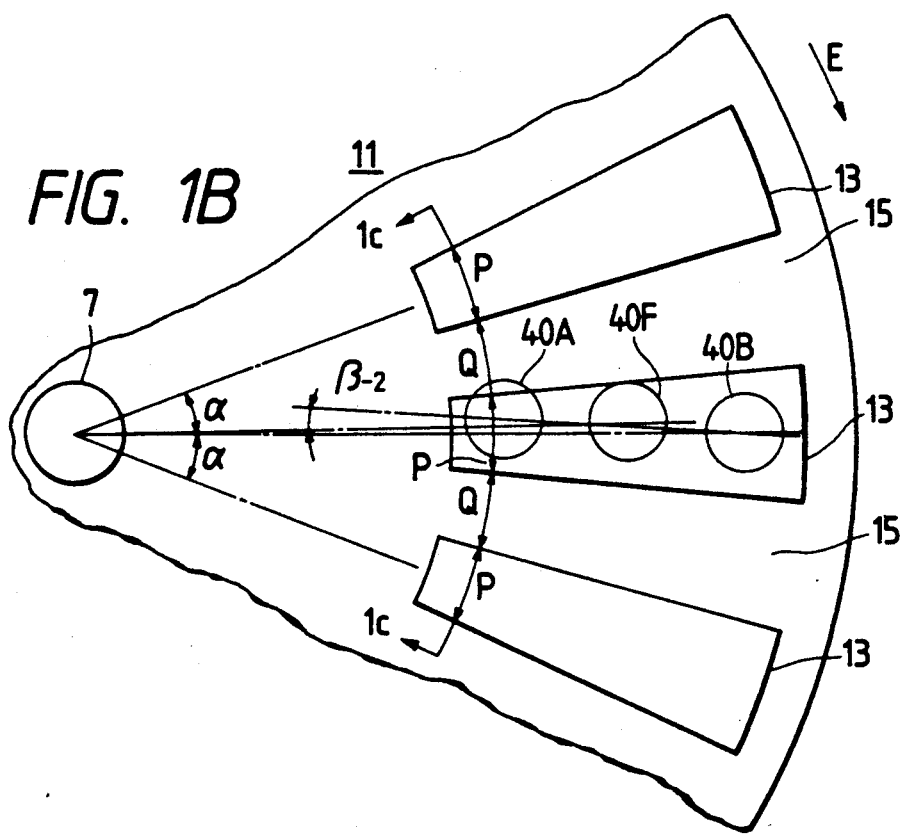
FIG. 1B is an enlarged fragmentary plan view of the encoder disc shown in FIG. IA.
Figure 1C:
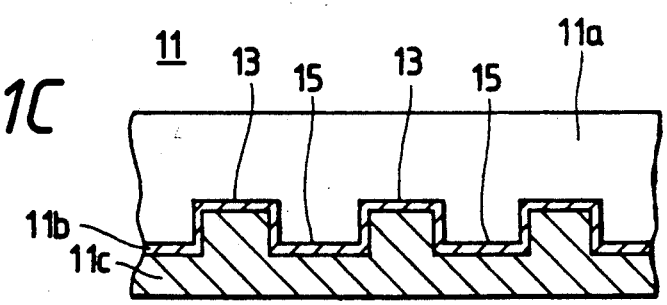
FIG. 1C is a cross-sectional view taken along line 1C—1C of FIG. 1B.

FIGS. 1A through 1C show a reflective rotary encoder disc 11 which is manufactured by the process of fabricating compact discs or video discs. The rotary encoder disc 11 is disclosed in the prior U.S. patent application U.S. Ser. No. 313,672. As shown in FIG. 1C, the encoder disc 11 comprises a circular base 11a made of a transparent plastic material such as a polycarbonate resin, the circular base 11a having an annular or ring-shaped pattern of radial pits 13 defined in one surface thereof and equally angularly spaced at angular intervals α, a reflecting film 11b of a metal such as aluminum disposed by evaporation or sputtering on the pitted surface of the base 11a, and a protective film 11c of an ultraviolet curing resin deposited intimately on the reflecting film 11b.

Laser beams are applied as beam spots to the encoder disc 11 from above in FIG. 1C. The laser beams first pass through the transparent base 11a and then are reflected upwardly by the reflecting film 11b. Therefore, the transparent base 11a normally faces a laser beam pickup device (described later on). From the standpoint of the laser beams applied to the encoder disc 11, the pits 13 do not appear as concavities but convexities, and lands 15 defined between the pits 13 do not appear as convexities but concavities.

As illustrated in FIG. 1B, an array of three laser beams 40A, 40F, 40B is applied as beam spots to the pits 13 by the laser beam pickup device. Each of the pits 13 has a length in the radial direction of the encoder disc 11, the length being sufficiently larger than the distance between the opposite ends of the outer laser beams 40A, 40B. Each of the pits 13 also has a height which substantially corresponds optically to ¼ of the wavelength λ of the laser beams. On one circular pattern on the encoder disc 11, the width P of each pit 13 and the width Q of each land 15 are equal to each other (P=Q), and are substantially the same as the diameter of each of the beam spots 40A, 40F, 40B. The alternately arranged pits 13 and lands 15 jointly make up an annular encoder track 12 having a pattern of regular surface convexities and concavities which will be detected by the laser beam pickup device.

The encoder disc 11 has a central hole 7 for passage therethrough of an input shaft (described later on) that is directly coupled to a drive shaft of a rotatable member whose rotational speed or angular position is to be detected.

The reflective rotary encoder disc 11 is incorporated in a reflective optical rotary encoder device shown in FIG. 2. The rotary encoder disc 11 is fixedly mounted on an input shaft 30 rotatably supported by a bearing (not shown) and extending through the central hole 7, so that the rotary encoder disc 11 will rotate with the input shaft 30. The input shaft 30 is directly coupled to a drive shaft (not shown) of a rotatable member whose rotational speed or angular position is to be detected. Therefore, the input shaft 30 is rotated about its own axis by the drive shaft. The pattern of the encoder track 12 which is composed of the pits 13 and the lands 15 is read by a laser beam pickup 31, which then detects the angular speed or angular position of the drive shaft.

The laser beam pickup 31 comprises a semiconductor laser 32, a diffraction grating 33, a collimator lens 34, a polarized beam splitter 35, a quarter wave plate 36, an objective lens 37, a cylindrical lens 38, and a photodiode 39.

A laser beam generated by the semiconductor laser 32 is divided into three laser beams by the diffraction grating 33. The central one of the three laser beams serves as the beam spot 40F which is used for focus servo, whereas the other laser beams, one on each side of the central laser beam, serve as the beam spots 40A, 40B which are used to read the encoder track 12. These three laser beams pass through the collimator lens 34, the polarized beam splitter 5, the quarter wave plate 36, and the objective lens 37, and are applied as the beam spots 40A, 40F, 40B to the encoder track 12 on the rotary encoder disc 11. The three beam spots 40A, 40F, 40B will also collectively be referred to as a beam spot 40. The three laser beams applied to the rotary encoder disc 11 are reflected by the surface of the reflecting film 11b of the encoder disc 11, and travel back through the objective lens 37 and the quarter wave plate 36. Since the laser beams have now passed through the quarter wave plate 36 twice, they are 90° out of phase with the laser beams before they first pass through the quarter wave plate 36. Therefore, the laser beams which have passed through the quarter wave plate 36 twice are not reflected by, but pass through, the polarized beam splitter 35. The laser beams that have passed through the polarized beam splitter 35 then go through the cylindrical lens 38 and are applied to the photodiode 39, by which the laser beams are converted to an electric signal that is produced as an amplified output signal by an amplifier 42.

As described above, the height of the pits 13 substantially corresponds optically to ¼ of the wavelength λ of the laser beam generated by the semiconductor laser 32. Therefore, the lengths of the optical paths along which the laser beams reflected from a pit 13 and the laser beams reflected from an adjacent land 15 differ from each other by (¼ of the wavelength)×2. As a consequence, when the beam spot 40 moves across the boundary between the pit 13 and the land 15, the laser beams reflected by the pit 13 and the land 15 interfere with each other and are diffracted, so that the intensity of the reflected laser beams is lowered.

FIG. 3A shows the beam spot 40A and FIG. 3B shows the encoder track 12 in cross section. FIGS. 3C and 3D illustrate the waveforms of output signals produced by the laser beam pickup device 31 when it detects reflected beams from the beam spots 40A, 40B, respectively.

When the encoder track 12 is rotated in the direction indicated by the arrow E (FIG. 3B), the laser beam pickup 31 produces an A-phase signal having a waveform c in response to a reflected beam from the beam spot 40A and a B-phase signal having a waveform d in response to a reflected beam from the beam spot 40B. In order that the A-phase signal and the B-phase signal will be out of phase with each other by an electric angle of 90°, the diffraction grating 33 is rotated to angularly displace the beam spots 40A, 40B from each other by a mechanical angle of $(\beta - 2)$ in the direction E in which the encoder track 12 rotates (clockwise in FIG. 1B). Since the pit width P and the land width Q are substantially the same as the diameter of the beam spots 40A, 40B, as described above, the polarity of the A- and B-phase signals varies in a symmetric sine-wave pattern, i.e., the duty cycle of these signals is about 50%.

The rotary encoder disc 11 may be mounted on the input shaft 30 with poor accuracy, and may axially oscillate during rotation, with the result that the beam spots applied to the rotary encoder disc 11 will be defocused. To avoid such a defocused condition, there is employed a focus servo for keeping the beam spot 40 properly focused on the surface of the encoder disc 11. The focus servo will be described below with reference to FIGS. 4A through 4C.

FIG. 4A shows the manner in which the focus servo operates when the surface of the encoder disc 11 is too close to the laser beam pickup 31 (i.e., the beam spot 40 is defocused). FIG. 4B shows the manner in which the focus servo operates when the beam spot 40F is properly focused on the surface of the encoder disc 11. FIG. 4C shows the manner in which the surface of the encoder disc 11 is too far from the laser beam pickup 31 (i.e., the beam spot 40 is defocused).

The focus servo includes the photodiode 39 in the laser beam pickup 31. As shown in FIGS. 4A through 4C, the photodiode 39 includes a four-sector photodiode 39F for receiving a reflected beam 41F from the central beam spot 40F (FIG. 1B). The four-sector photodiode 39F includes two diagonal pairs of detectors. The output signals from the detectors of each pair are added to each other, and the sum signals from the detector pairs are applied to the input terminals, respectively, of a differential amplifier 42F connected to a focus servo circuit (not shown). When the beam spot 40F is focused on the encoder disc 11, i.e., when the encoder disc 11 is in the properly focused position, the reflected beam 40F forms a circular spot that falls equally on the four detectors of the four-sector photodiode 39F, as shown in FIG. 4B. Therefore, the differential amplifier 42F produces no output signal, and the focus servo circuit does not operate. When the encoder disc 11 is too close to or too far from the laser beam pickup 31, the reflected beam 41F forms an elliptical spot on the four-sector photodiode 39F, and thus the differential amplifier 42F produces a focus servo signal. In response to the focus servo signal, the focus servo circular operates a focus servo actuator (not shown) to move the objective lens 37 for focusing the beam spot 40 on the encoder disc 11. Therefore, the beam spot 40 is always well focused on the surface of the reflecting film 11b of the encoder disc 11.

The A- and B-phase signals are generated as follows:

FIG. 5 shows the photodiode 39 in greater detail. The photodiode 39 includes, in addition to the four-sector photodiode 39F, two photodiodes 39A, 39B for receiving reflected beams 41A, 41B respectively from the beam spots 40A, 40B. The photodiodes 39A are disposed one on each side of the four-sector photodiode 39F which detects the reflected beam 41F. The photodiodes 39A, 39B produce respective output signals which are amplified into the A-and B-phase signals, respectively, by corresponding amplifiers 42A, 42B.

If the pit width P and the land width Q on the rotary encoder disc 11 are increased as compared with the diameter of the beam spots according to desired specifications for the encoder track 12, then the waveforms of the A-and B-phase signals produced by the amplifiers 42A, 42B will be of a distorted shape which is different from the symmetric waveforms shown in FIGS. 3C and 3D.

More specifically, FIG. 6A shows an encoder track in which a pit width P and a land width Q which are large as compared with the diameter of the beam spots, and FIG. 6B shows the waveform of an output signal produced by a reflected beam from a beam spot applied to the encoder track of FIG. 6A. As shown in FIG. 6A, the width P of a pit 13-2 and the width Q of a land 15-2 are about 2.5 times, for example, larger than the diameter of the beam spot 40A. As shown in FIG. 6B, the resultant output signal waveform e has a low peak-to-peak value, and is of an asymmetric shape with the duty cycle much larger than 50%. Such a distorted waveform is disadvantageous in that it cannot be processed easily when one pulse is divided into several pulses for increased detection accuracy.

Figure 7A:
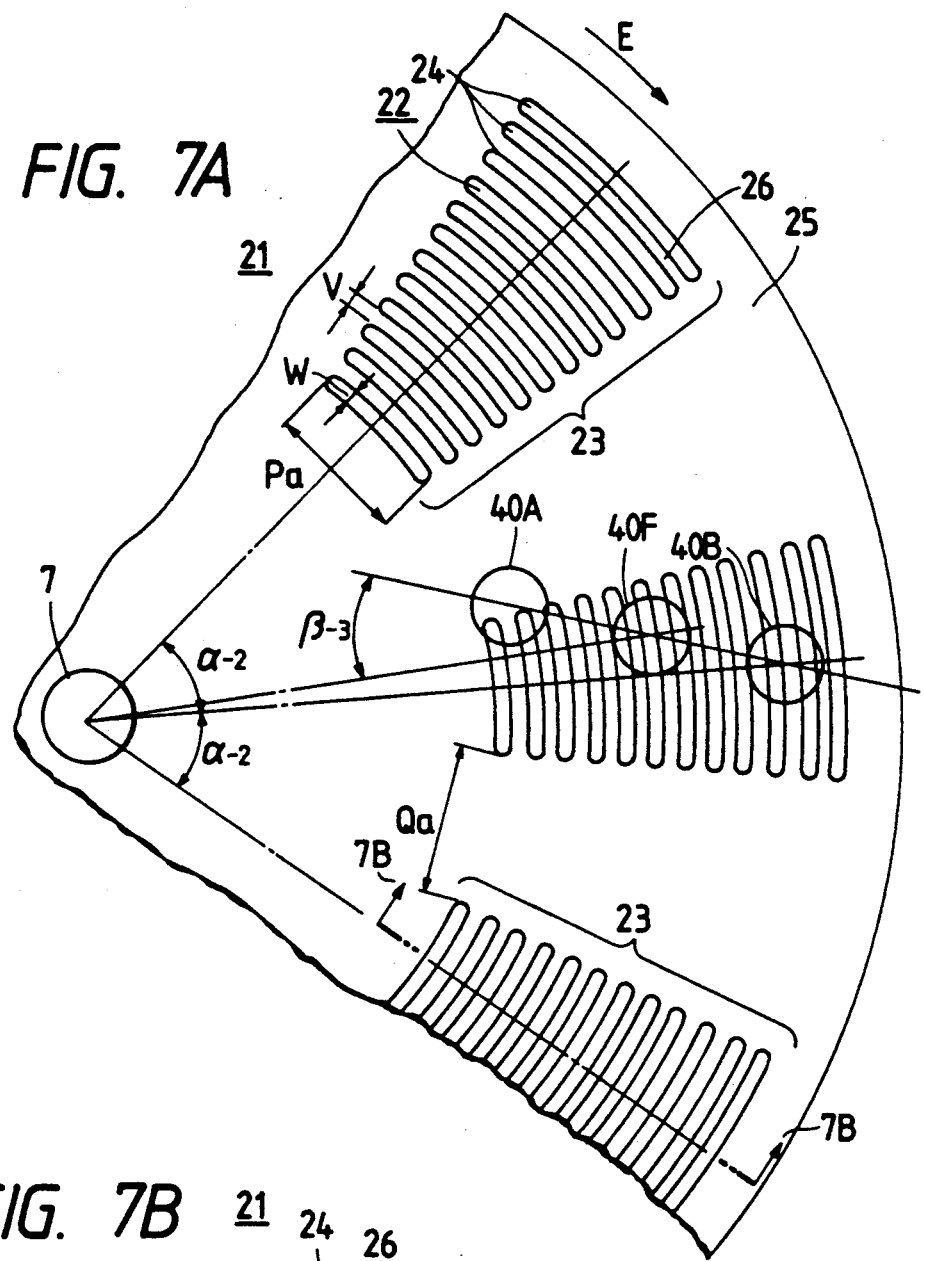
FIG. 7A is an enlarged fragmentary plan view of another reflective optical encoder disc.
Figure 7B:
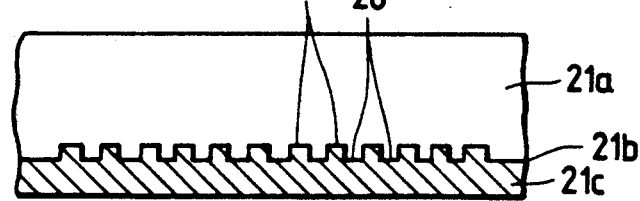
FIG. 7B is a cross-sectional view taken along line 7B—7B of FIG. 7A.

There has been proposed another reflective rotary encoder disc for solving the above problem, as also disclosed in the prior U.S. patent application U.S. Ser. No. 313,672. As shown in FIGS. 7A and 7B, the encoder disc, generally denoted at 21, comprises a circular base 21a having an annular or ring-shaped pattern of pit units 23 defined in one surface thereof and each composed of a plurality of radially spaced arcuate pits 24 each having a width W smaller than the diameter of a beam spot 40. Each of the pit units 23 corresponds to one of the pits 13 shown in FIGS. 1A through 1C. The encoder disc 21 also includes a reflecting film 21b disposed on the pitted surface of the base 21a, and a protective film 21c deposited on the reflecting film 21b. The pit units 23 are equally angularly spaced at angular intervals $(\alpha - 2)$ which are larger than the angular interval $\alpha$ (FIG. 1B), and jointly form an encoder track 22. Each of the pit units 23 has a minimum width Pa and each of lands 25 lying circumferentially between the pit units 23 has a minimum width Qa. The pit width Pa and the land width Qa are larger than the diameter of the beam spot 40.

The width W of each of the pits 24 is about ¼ of the diameter of the beam spot 40, and each of lands 26 lying radially between the pits 24 has a width V which is also about ¼ of the diameter of the beam spot 40. Each of the pits 24 also has a height which substantially corresponds optically to ¼ of the wavelength λ of the laser beams. The structural details of the encoder disc 21 other than the encoder track 22 described above are identical to those shown in FIGS. 1A through 1C.

The reflective rotary encoder disc 21 can also be incorporated in the reflective optical rotary encoder device shown in FIG. 2.

The reflective optical rotary encoder device with the encoding disc 21 employed operates in the same manner as described above. However, a reflected beam from the beam spot 40 falling on each of the pit units 23 is reduced in intensity because a beam reflected from a pit 24 and a beam reflected from an adjacent land 26 interfere with each other and are diffracted since they travel along different optical paths.

FIGS. 8A and 8B show the waveforms of A- and B-phase signals which are produced by reflected beams from the beam spots 40A, 40B, that are applied to the encoder disc 21 by the laser beam pickup 31 shown in FIG. 2.

When the encoder disc 21 is rotated in the direction indicated by the arrow E (FIG. 7A), the laser beam pickup 31 producer an A-phase signal having a waveform f (FIG. 8A) in response to a reflected beam from the beam spot 40A and a B-phase signal having a waveform g (FIG. 8B) in response to a reflected beam from the beam spot 40B. Each of the A- and B-phase signals has a duty cycle of 50%, i.e., each of the waveforms f, g, is of a symmetric shape. In order that the A-phase signal and the B-phase signal will be out of phase with each other by an electric angle of 90°, the diffraction grating 33 is rotated to angularly displace the beam spots 40A, 40 B from each other by a mechanical angle of $(\beta-3)$ in the direction E in which the encoder track 12 rotates (clockwise in FIG. 7A). The peak-to-peak value of each of the waveforms f, g is increased by selecting the pit width W and the land width V such that the reflected beams will interfere with each other to a large extent.

If the angular intervals between the pit units 23 were selected to be $\alpha$ and the pit units 23 were of the same size as the pits 13 (FIGS. 1A through 1C), then the waveforms of produced output signals would have a large peak-to-peak value and be of a sine-wave shape.

The rotary encoder disc 11 shown in FIGS. 1A through 1C has disadvantages in that if the pit width P and the land width C are increased as compared with the beam spot diameter to meet desired specifications, then the output signal waveforms have a small peak-to-peak value and are of a distorted asymmetric shape, and hence the reflecting-type optical rotary encoder incorporating the encoder disc 11 cannot be designed with large freedom.

With the reflective optical rotary encoder device incorporating the rotary encoder disc 21 shown in FIGS. 7A and 7B, when the encoder disc 21 rotates at a speed of several hundred RPM, the focus servo signal produced by the differential amplifier 42F (FIGS. 4A and 5) is disturbed by the pits 24 at a frequency higher than the servo frequency range from DC to 3 kHz, and no problem occurs. However, when the encoder disc 21 rotates at a lower speed, the focus servo signal is disturbed in the focus servo frequency, with the result that the focus servo operation will be adversely affected and the beam spots will not be properly focused on the encoder disc 21.

The present invention has been made in an effort to solve the above problems with the rotary encoder discs 11, 21 disclosed in the prior U.S. patent application U.S. Ser. No. 313,672. The present invention will now be described in detail below.

Figure 9A:
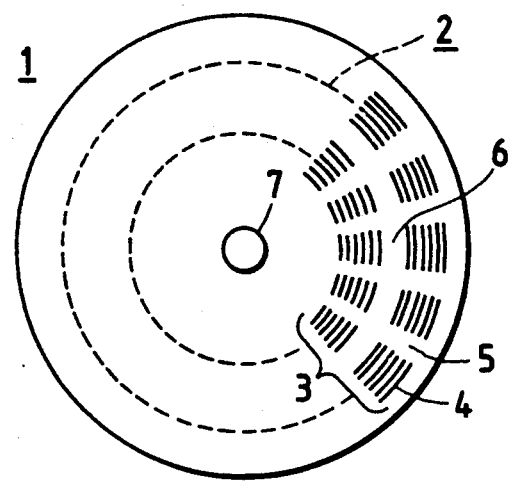
FIG. 9A is a schematic plan view of a reflective optical encoder disc according to an embodiment of the present invention.
Figure 9B:
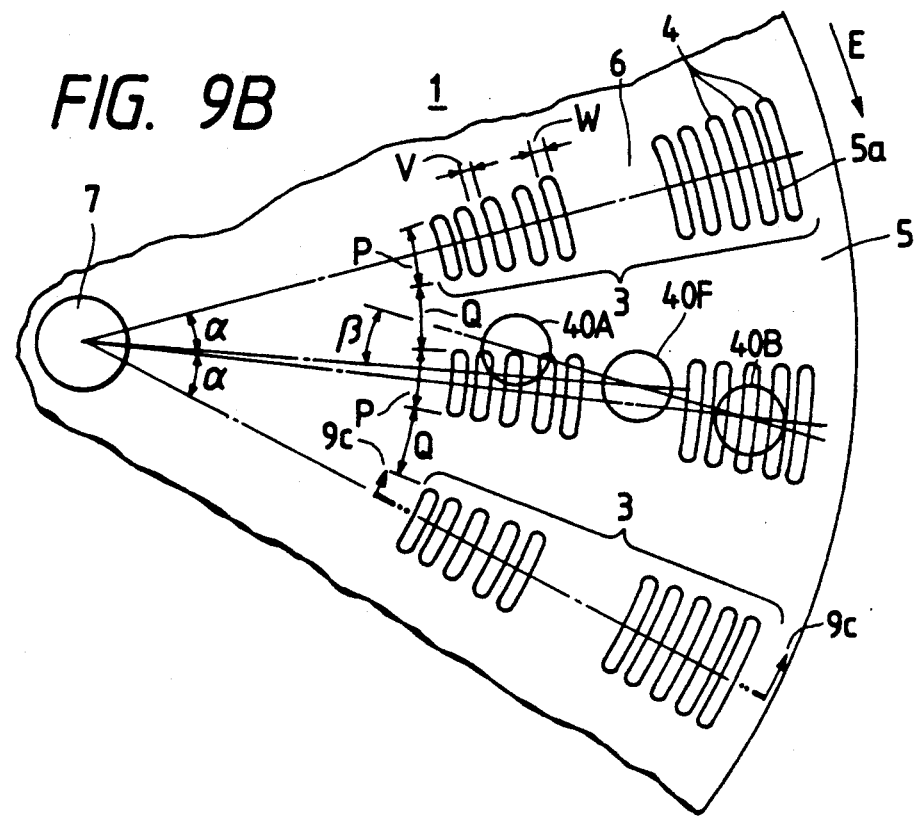
FIG. 9B is an enlarged fragmentary plan view of the encoder disc shown in FIG. 9A.
Figure 9C:
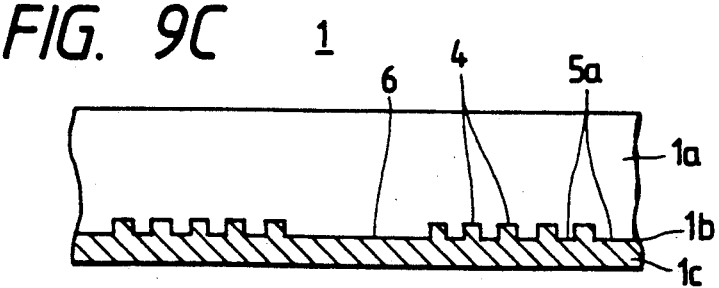
FIG. 9C is a cross-sectional view taken along line 9C—9C of FIG 9B.

FIGS. 9A through 9C show a rotary encoder disc 1 according to an embodiment of the present invention. The rotary encoder disc 1 comprises a circular base 1a having an annular or ring-shaped pattern of pit units 3 defined in one surface thereof and each composed of a plurality of radially spaced arcuate pits 4 each having a width W smaller than the diameter of a beam spot 40. Each of the pit units 3 corresponds to one of the pits 13 shown in FIGS. 1A through 1C. The encoder disc 1 also includes a reflecting film 1b disposed on the pitted surface of the base 1a, and a protective film 1c deposited on the reflecting film 1b. The pit units 3 are equally angularly spaced at angular intervals $\alpha$, and jointly form an encoder track 2. Each of the pit units 3 has a minimum width P and each of lands 5 lying circumferentially between the pit units 3 has a minimum width Q.

The width W of each of the pits 4 is about $\frac{1}{4}$ of the diameter of the beam spot 40, and each of lands 5a lying radially between the pits 4 has a width V which is also about $\frac{1}{4}$ of the diameter of the beam spot 40. Each of the pits 4 also has a height which substantially corresponds optically to $\frac{1}{4}$ of the wavelength $\lambda$ of the laser beams.

Each of the pit units 3 has a length in the radial direction of the encoder disc 1, the length being sufficiently larger than the distance between the opposite ends of the outer laser beams 40A, 40B. One one circular pattern on the encoder disc 11, the width P of each pit 3 and the width Q of each land 5 are equal to each other (P=Q), and are substantially the same as the diameter of each of the beam spots 40A, 40F, 40B.

The encoder track 2 includes an annular focus servo track 6 free of any pits 4, the annular focus servo track 6 lying radially centrally in the encoder track 2. The beam spot 40F for the focus servo is applied to the focus servo track 6. The focus track 6 has a radial width larger than a range in which the beam spot 40F is applied to the encoder disc 1 while it is making one revolution.

The structural details of the encoder disc 1 other than the encoder track 2 described above are identical to those shown in FIGS. 8A and 8B.

The reflective rotary encoder disc 1 can be incorporated in the reflective optical rotary encoder device shown in FIG. 2. The reflective optical rotary encoder device operates in the same manner as described above. Since the focus servo track 6 to which the beam spot 40F is applied is free of any pits 4, the focus servo operation of the reflective optical rotary is not adversely affected.

Figure 10A:
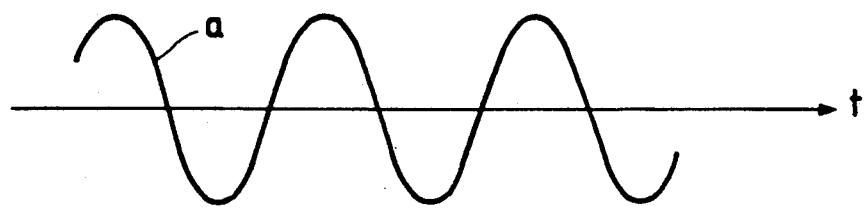
FIGS. 10A and 10B are diagrams showing output signal waveforms of the rotary encoder device of FIG. 2 which incorporates the encoder disc shown in FIGS. 9A through 9C.
Figure 10B:
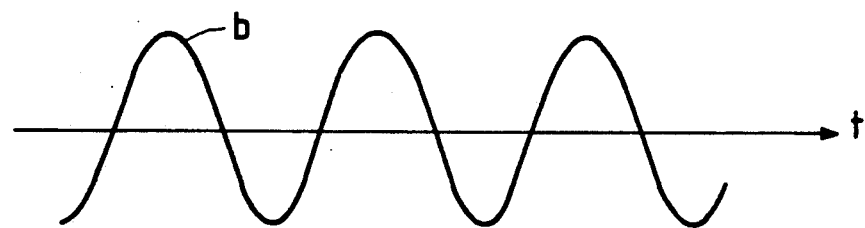

When the encoder disc 1 is rotated in the direction indicated by the arrow E (FIG. 9B), the laser beam pickup 31 produces a A-phase signal having a waveform a (FIG. 10A) in response to a reflected beam from the beam spot 40A and a B-phase signal having a waveform b (FIG. 10B) in response to a reflected beam from the beam spot 40B. Each of the A- and B-phase signals has a duty cycle of 50%, i.e., each of the waveforms a, b is of a symmetric shape. In order that the A-phase signal and the B-phase signal will be out of phase with each other by an electric angle of 90°, the diffraction grating 33 is rotated to angularly displace the beam spots 40A, 40B from each other by a mechanical angle of $\beta$ in the direction E in which the encoder track 12 rotates (clockwise in FIG. 9B). The peak-to-peak value of each of the waveforms a, b is increased by selecting the pit width W and the land width V such that the reflected beams will interfere with each other to a large extent.

If the angular intervals between the pit units 3 were selected to be ($\alpha-2$) and the pits 4 were of the same size as the pits 24 (FIGS. 7A and 7B), then produced output signals would have a waveform as shown in FIGS. 8A and 8B, and the focus servo operation would also be stabilized.

Figure 11A:
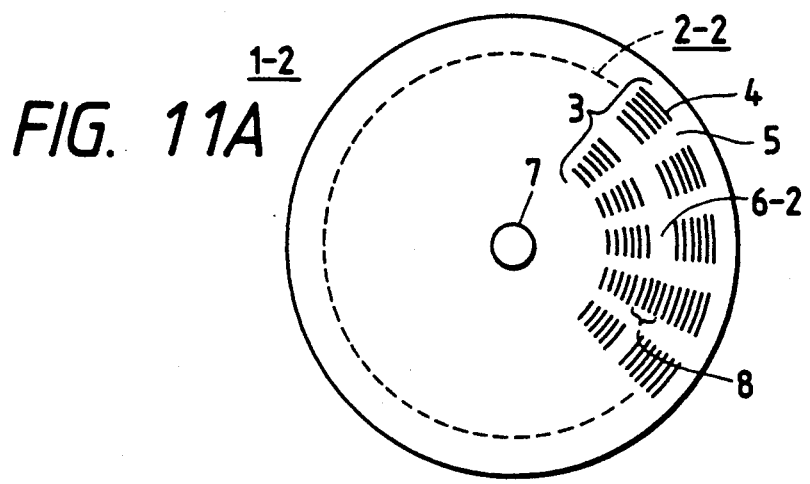
FIG. 11A is a schematic plan view of a reflective optical encoder disc according to another embodiment of the present invention.
Figure 11B:
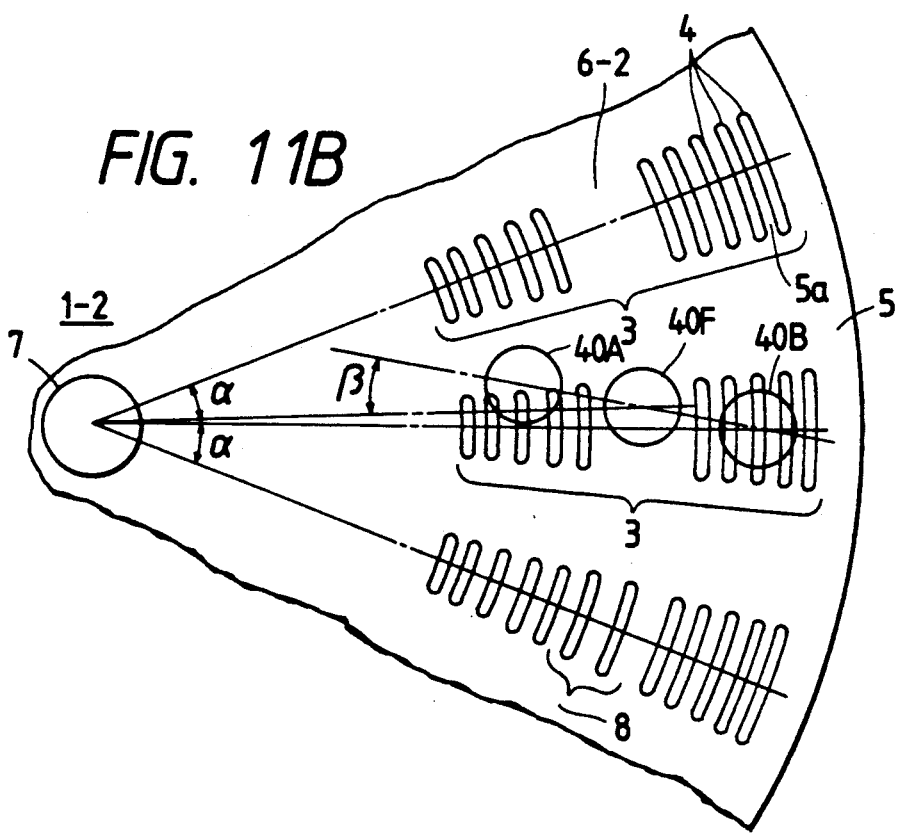
FIG. 11B is an enlarged fragmentary plan view of the encoder disc shown in FIG. 11A.

FIGS. 11A and 11B show a rotary encoder disc 1-2 according to another embodiment of the present invention. The rotary encoder disc 1-2 is the same as the rotary encoder disc 1 shown in FIGS. 9A through 9C except that a focus servo track 6-2 positioned radially centrally in an encoder track 2-2 has a group of arcuate reference pits 8 for generating a reference signal used as a Z-phase signal indicative of a zero address on the encoder disc 1-2. The reference pits 8 are located in one of the pit units 3, and are similar to the pits 4 of that pit unit 3. However, a single pit similar to one of the pits 13 shown in FIGS. 1A through 1C may be employed as such a reference pit. If such a single reference pit is employed, then the width P thereof should be about ¼ of the diameter of the beam spot 40F.

The reflective rotary encoder disc 1-2 can be incorporated in the reflective optical rotary encoder device shown in FIG. 2. The reflective optical rotary encoder device operates in the same manner as described above. However, each time the encoder disc 1-2 makes one revolution, the rotary encoder produces a one-pulse Z-phase signal serving as a reference signal in response to the reflection of the beam spot 40F from the reference pits 8. The Z-phase signal may be produced for example by adding the output signals from the four detectors of the four-sector photodiode 39F (FIGS. 4A through 4C and 5) and amplifying the sum with an amplifier (not shown).

Figure 12A:
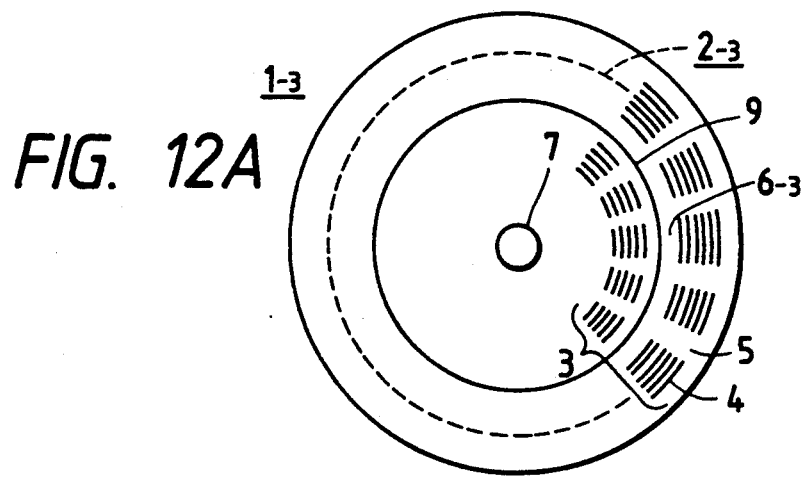
FIG. 12A is a schematic plan view of a reflective optical encoder disc according to still another embodiment of the present invention.
Figure 12B:
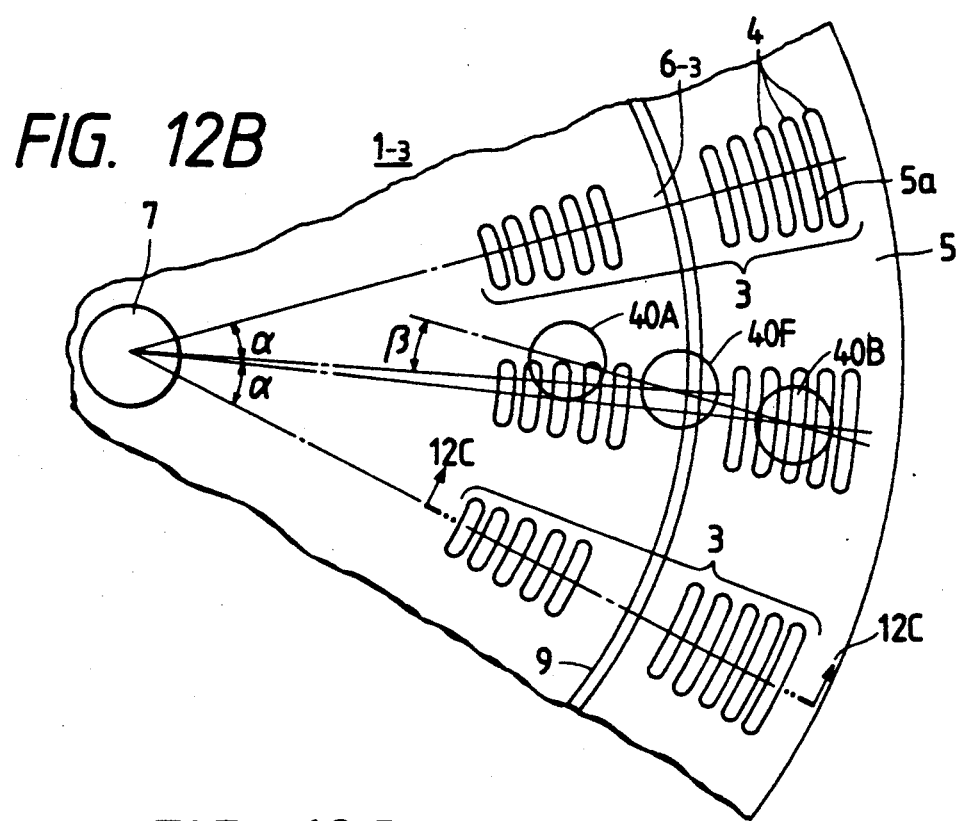
FIG. 12B is an enlarged fragmentary plan view of the encoder disc shown in FIG. 12A.
Figure 12C:
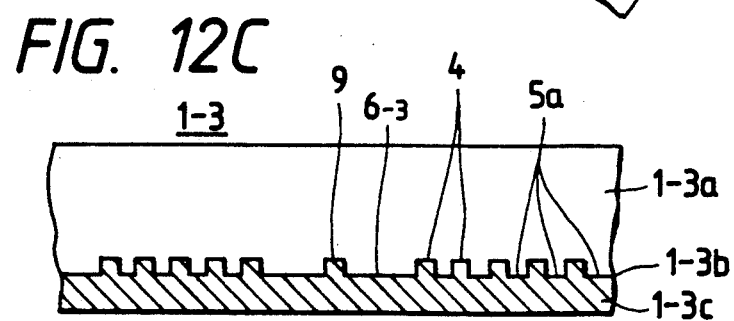
FIG. 12C is a cross-sectional view taken along line 12C—12C of FIG. 12B.

FIGS. 12A through 12C show a rotary encoder disc 1-3 according to still another embodiment of the present invention. The rotary encoder disc 1-3 comprises a circular base 1-3a, a reflecting film 1-3b, and a protective film 1-3c, as with the rotary encoder disc 1 shown in FIGS. 9A through 9C. The rotary encoder disc 1-3 differs from the rotary encoder disc 1 shown in FIGS. 9A through 9C in that an annular tracking servo pit 9 is positioned in a focus servo track 6-3 which is positioned radially centrally in an encoder track 2-3. The annular tracking servo pit 9 lies radially centrally in the focus servo track 6-3 in concentric relation to the central hole 7 of the encoder disc 1-3. The tracking servo pit 9 has a radial width which is about ¼ of the diameter of the beam spot 40F, and a height corresponding optically to about ¼ of the wavelength λ of the laser beams.

The reflective rotary encoder disc 1-3 can be incorporated in the reflective optical rotary encoder device shown in FIG. 2. The reflective optical rotary encoder device operates in the same manner as described above. However, while the encoder disc 1-3 is rotating, the beam spot 40F is controlled by a tracking servo to follow the tracking servo pit 9 at all times, so that the output signal of the laser beam pickup device 31 will not suffer from fluctuations which would otherwise be caused by undesirable eccentricity of the encoder disc 1-3.

Figure 13:
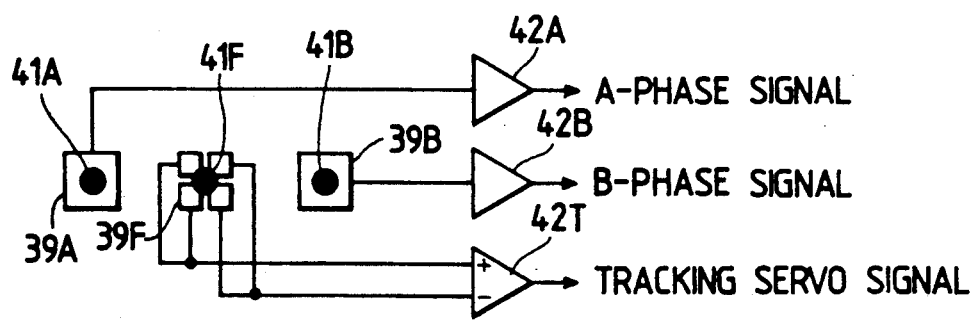
FIG. 13 is a diagram of another signal output section of the rotary encoder device of FIG. 2.

The tracking servo will operate as follows:

As shown in FIG. 13, the output signals from two detectors of the four-sector photodiode 39F which are closer to the photodiode 39A are added to each other, and the sum signal is applied to one input terminal of a differential amplifier 42T, whereas the output signals from the other two detectors of the four-sector photodiode 39F which are closer to the photodiode 39B are added to each other, and the sum signal is applied to the other input terminal of the differential amplifier 42T. If the beam spot 40F is displaced from the tracking servo pit 9, then the input signals applied to the input terminals of the differential amplifier 42T vary, causing the differential amplifier 42T to produce a tracking servo signal. The tracking servo signal is then applied to a tracking servo actuator (not shown) which moves the laser beam pickup 31 to positionally correct the beam spot 40F radially so that the tracking servo pit 9 will always be positioned centrally across the beam spot 40F.

The tracking servo pit 9 may also be combined with the encoder disc 1-2 shown in FIGS. 11A and 11B.

In each of the above embodiments of the present invention, each of the pits 4 is arcuate in shape. However, each of the pits 4 may extend radially, or extend at an angle to the radial direction. While the pit units 3 are shown as being disposed on only one side of the rotary encoder discs 1, 1-2, 1-3, they may be provided on each of the opposite sides of the encoder discs.

The principles of the present invention are also applicable to a reflective optical liner encoder disc for detecting a linear motion of a movable member.

Although certain preferred embodiments have been shown and described, it should be understood that many changes and modifications may be made therein without departing from the scope of the appended claims.

What is claimed is:

1. A reflective optical rotary encoder disc for use in a reflective optical rotary encoder device for detecting an angular speed or position of a movable member with a light beam applied to and reflected from the reflective optical rotary encoder, said reflective optical rotary encoder disc comprising:

an annular rotary encoder track for reflecting the light beam, said rotary encoder track being composed of an annular pattern of angularly spaced pit units each including a plurality of radially spaced arcuate pits; and a pit-free annular focus servo track for focusing the light beam onto the rotary encoder track, said focus servo track extending along and being disposed radially substantially centrally in said annular rotary encoder track.

2. A reflective optical rotary encoder disc according to claim 1, further including at least one arcuate reference pit for reflecting the light beam to produce a reference signal, said reference pit being positioned in said focus servo track and radially aligned with one of said pit units.

3. A reflective optical rotary encoder according to claim 1, further including an annular tracking servo pit for keeping the light beam applied thereto, said annular tracking servo pit extending along and being disposed radially substantially centrally in said annular focus servo track.

* * * * *